(12) United States Patent
Morse et al.

(10) Patent No.: US 11,703,887 B2
(45) Date of Patent: *Jul. 18, 2023

(54) SYSTEMS AND METHODS FOR SOLAR TRACKERS WITH DIFFUSE LIGHT TRACKING

(71) Applicant: FTC Solar, Inc., Austin, TX (US)

(72) Inventors: Andrew Joseph Morse, Mount Airy, MD (US); Nagendra Srinivas Cherukupalli, Cupertino, CA (US); Tamilarasan Mouniandy, Chennai (IN)

(73) Assignee: FTC Solar, Inc., Austin, TX (US)

( * ) Notice: Subject to any disclaimer, the term of this patent is extended or adjusted under 35 U.S.C. 154(b) by 215 days.

This patent is subject to a terminal disclaimer.

(21) Appl. No.: 17/183,829

(22) Filed: Feb. 24, 2021

(65) Prior Publication Data

US 2022/0083079 A1 Mar. 17, 2022

Related U.S. Application Data

(63) Continuation of application No. 17/022,974, filed on Sep. 16, 2020, now Pat. No. 10,935,992.

(51) Int. Cl.
*G05D 3/10* (2006.01)
*H02S 50/00* (2014.01)
*H02S 20/32* (2014.01)
*G01S 3/786* (2006.01)

(52) U.S. Cl.
CPC ............ *G05D 3/105* (2013.01); *G01S 3/7861* (2013.01); *H02S 20/32* (2014.12); *H02S 50/00* (2013.01)

(58) Field of Classification Search
CPC ......... G05D 3/105; H02S 20/32; H02S 50/00; G01S 3/7861
See application file for complete search history.

(56) References Cited

U.S. PATENT DOCUMENTS

| | | | |
|---|---|---|---|
| 4,202,321 A | 5/1980 | Tolna | |
| 4,223,214 A | 9/1980 | Dorian et al. | |
| 4,226,502 A | 10/1980 | Gunzler | |
| 4,328,789 A | 5/1982 | Nelson | |
| 4,365,616 A | 12/1982 | Vandenberg | |
| 4,383,520 A | 5/1983 | Huebl et al. | |
| 4,574,659 A | 3/1986 | Arndt | |

(Continued)

OTHER PUBLICATIONS

US 10,768,266 B2, 09/2020, Corio (withdrawn)

*Primary Examiner* — Georgia Y Epps
*Assistant Examiner* — Don J Williams
(74) *Attorney, Agent, or Firm* — Armstrong Teasdale LLP

(57) ABSTRACT

A system includes a tracker configured to collect solar irradiance and attached to a rotational mechanism for changing a plane of the tracker and a controller. The controller is programmed to store a plurality of positional and solar tracking information and detect a first amount of DHI and a first amount of DNI at a first specific point in time. If the first amount of SHI exceeds the first amount of DNI, the controller is programmed to calculate a first angle for the tracker to maximize an amount of irradiance received by the tracker. Otherwise, the controller is programmed to calculate the first angle for the tracker based on a position of the sun associated with the first specific point in time and the plurality of positional and solar tracking information.

20 Claims, 8 Drawing Sheets

(56) References Cited

U.S. PATENT DOCUMENTS

| | | |
|---|---|---|
| 4,883,340 A | 11/1989 | Dominguez |
| 7,374,137 B2 | 5/2008 | Staney |
| 7,692,091 B2 | 4/2010 | Altaii et al. |
| 8,151,787 B1 | 4/2012 | Sivert |
| 8,274,028 B2 | 9/2012 | Needham |
| 8,413,391 B2 | 4/2013 | Seery et al. |
| 8,459,249 B2 | 6/2013 | Corio |
| 8,502,129 B2 | 8/2013 | Miller et al. |
| 8,511,297 B2 | 8/2013 | McNeil-Yeckel et al. |
| 8,615,939 B2 | 12/2013 | Seery et al. |
| 8,671,930 B2 | 3/2014 | Liao |
| 8,704,082 B2 | 4/2014 | Angoli et al. |
| 8,878,112 B2 | 11/2014 | Lee |
| 8,904,774 B2 | 12/2014 | Gee |
| 8,933,660 B2 | 1/2015 | Heumann et al. |
| 8,993,870 B2 | 3/2015 | Eom |
| 9,038,329 B2 | 5/2015 | Pelman et al. |
| 9,074,797 B2 | 7/2015 | Miller et al. |
| 9,166,525 B2 | 10/2015 | Grant |
| 9,188,367 B2 | 11/2015 | Jang |
| 9,443,999 B2 | 9/2016 | Polk |
| 9,531,320 B2 | 12/2016 | Gonzalez Moreno |
| 9,551,508 B2 | 1/2017 | Straeter |
| 9,568,215 B2 | 2/2017 | Patwardhan et al. |
| 9,581,678 B2 | 2/2017 | Corio |
| 9,593,867 B2 | 3/2017 | Seery et al. |
| 9,601,645 B2 | 3/2017 | Seery et al. |
| 9,727,060 B2 | 8/2017 | Coupart |
| 9,766,319 B2 | 9/2017 | Au |
| 9,831,819 B2 | 11/2017 | Kirk et al. |
| 9,863,667 B2 | 1/2018 | Au |
| 9,905,717 B2 | 2/2018 | Au |
| 9,923,510 B2 | 3/2018 | Au |
| 9,970,686 B2 | 5/2018 | Au |
| 9,998,068 B2 | 6/2018 | Au |
| 10,008,975 B2 | 6/2018 | Au |
| 10,042,030 B2 | 8/2018 | Corio |
| 10,075,125 B2 | 9/2018 | Liu et al. |
| 10,171,024 B2 | 1/2019 | Polk |
| 10,222,446 B2 | 3/2019 | Au |
| 10,340,839 B2 | 7/2019 | Almy et al. |
| 10,340,840 B2 | 7/2019 | Almy et al. |
| 10,379,193 B2 | 8/2019 | Au |
| 10,461,682 B2 | 10/2019 | Schuit et al. |
| 10,514,185 B2 | 12/2019 | Ingram |
| 10,541,644 B2 | 1/2020 | Arliaud et al. |
| 10,557,646 B1 | 2/2020 | Ma et al. |
| 10,594,253 B2 | 3/2020 | Henderson et al. |
| 10,619,891 B2 | 4/2020 | Menard |
| 10,630,231 B2 | 4/2020 | Needham et al. |
| 10,648,528 B2 | 5/2020 | Kull et al. |
| 10,654,420 B2 | 5/2020 | Levi |
| 10,684,348 B2 | 6/2020 | Arliaud et al. |
| 10,771,007 B2 | 9/2020 | Corio |
| 10,848,097 B1 | 11/2020 | Needham et al. |
| 10,935,992 B1 * | 3/2021 | Morse ............ G01S 3/7861 |
| 2008/0264474 A1 | 10/2008 | Frauenknecht et al. |
| 2010/0089390 A1 | 4/2010 | Miros et al. |
| 2010/0095955 A1 | 4/2010 | Carrasco Martinez |
| 2011/0041834 A1 | 2/2011 | Liao |
| 2012/0125399 A1 | 5/2012 | Schatz et al. |
| 2012/0152310 A1 | 6/2012 | Hinman et al. |
| 2012/0152311 A1 | 6/2012 | Miller et al. |
| 2012/0174962 A1 | 7/2012 | Koningstein et al. |
| 2013/0019921 A1 | 1/2013 | Au |
| 2013/0247962 A1 | 9/2013 | Sakai et al. |
| 2013/0319402 A1 | 12/2013 | Shaw |
| 2013/0341294 A1 | 12/2013 | Reynolds et al. |
| 2014/0076400 A1 | 3/2014 | Chung et al. |
| 2014/0224300 A1 | 8/2014 | Liu |
| 2016/0118929 A1 | 4/2016 | Krause |
| 2017/0025989 A1 | 1/2017 | Shaw |
| 2017/0093329 A1 | 3/2017 | Jensen |
| 2017/0102168 A1 | 4/2017 | Childress |
| 2017/0301814 A1 | 10/2017 | Au |
| 2018/0013380 A1 | 1/2018 | Childress et al. |
| 2018/0024222 A1 | 1/2018 | Au |
| 2018/0054156 A1 | 2/2018 | Lokey |
| 2018/0076757 A1 | 3/2018 | Gross et al. |
| 2018/0091088 A1 | 3/2018 | Barton et al. |
| 2018/0167025 A1 | 6/2018 | Au |
| 2018/0224161 A1 | 8/2018 | Au |
| 2018/0302026 A1 | 10/2018 | Basel et al. |
| 2018/0302027 A1 | 10/2018 | Betts et al. |
| 2018/0358921 A1 | 12/2018 | Henderson et al. |
| 2019/0036478 A1 | 1/2019 | Liu et al. |
| 2019/0131920 A1 | 5/2019 | Au |
| 2019/0199276 A1 | 6/2019 | Bailey et al. |
| 2019/0204405 A1 | 7/2019 | Arliaud et al. |
| 2019/0296686 A1 | 9/2019 | Kresse et al. |
| 2019/0296688 A1 | 9/2019 | Kresse et al. |
| 2019/0319578 A1 | 10/2019 | Needham et al. |
| 2019/0356265 A1 | 11/2019 | Liu et al. |
| 2020/0036325 A1 | 1/2020 | Poivet |
| 2020/0076356 A1 | 3/2020 | Cherukupalli et al. |
| 2020/0076359 A1 | 3/2020 | Bahn |
| 2020/0153381 A1 | 5/2020 | Michotte de Welle et al. |
| 2020/0162015 A1 | 5/2020 | Upfill-Brown et al. |
| 2020/0182513 A1 | 6/2020 | Ma et al. |
| 2020/0235696 A1 | 7/2020 | Arliaud et al. |
| 2020/0309893 A1 | 10/2020 | Arliaud et al. |

* cited by examiner

SYSTEMS AND METHODS FOR SOLAR TRACKERS WITH DIFFUSE LIGHT TRACKING

CROSS-REFERENCE TO RELATED APPLICATIONS

This application claims priority to and is a continuation of U.S. patent application Ser. No. 17/022,974, filed Sep. 16, 2020, entitled "SYSTEMS AND METHODS FOR SOLAR TRACKERS WITH DIFFUSE LIGHT TRACKING," the entire contents and disclosure of which are hereby incorporated herein by reference in their entirety.

FIELD

The field relates generally to tracking systems for adjusting solar arrays and panels and, more specifically, to adjusting the range of motion for solar trackers to account for diffuse light conditions.

BACKGROUND

Recently, the development of a variety of energy substitution such as, a clean energy source and environment friendly energy are emerging to replace fossil fuels due to the shortage of fossil fuels, environmental contamination issues, etc. One of the solutions is to use solar energy. This type of solar energy use can be categorized into three types; one of the types converts solar energy to heat energy and uses it for heating or boiling water. The converted heat energy can also be used to operate a generator to generate electric energy. The second type is used to condense sunlight and induce it into fiber optics which is then used for lighting. The third type is to directly convert light energy of the sun to electric energy using solar cells.

Solar trackers are groups of collection devices, such as solar modules. Some solar trackers are configured to follow the path of the sun to minimize the angle of incidence between incoming sunlight and the solar tracker to maximize the solar energy collected. To face the sun correctly, a program or device to track the sun is necessary. This is called a sunlight tracking system or tracking system. The method to track the sunlight can generally be categorized as a method of using a sensor or a method of using a program.

In terms of a power generation system using solar energy, a large number of solar trackers are generally installed on a vast area of flat land and as it is impossible to install more than two modules of solar trackers to overlap, a vast space of land is required. However, some weather conditions, such as cloudy conditions, the direct normal irradiance (DNI) (otherwise known as beam irradiance) is exceeded by the diffuse horizontal irradiance (DHI). The DNI represents the solar irradiance received that came in a straight line from the sun. The DHI represents the irradiance received that does not arrive in a direct path from the sun. This irradiance has been scattered by molecules and particles in the atmosphere and comes equally from all directions. In these conditions, the tracker may need to be adjusted to properly manage those conditions.

This Background section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, a system is provided. The system includes a tracker attached to a rotational mechanism for changing a plane of the tracker, wherein the tracker is configured to collect solar irradiance. The system also includes a controller in communication with the rotational mechanism. The controller includes at least one processor in communication with at least one memory device. The at least one processor is programmed to store, in the at least one memory device, a plurality of positional and solar tracking information. The at least one processor is also programmed to detect a first amount of diffuse horizontal irradiance (DHI) and a first amount of direct normal irradiance (DNI) at a first specific point in time. If the first amount of diffuse horizontal irradiance exceeds the first amount of direct normal irradiance, the at least one processor is programmed to calculate a first angle for the tracker to maximize an amount of irradiance received by the tracker. The tracker receives a portion of the first amount of diffuse horizontal irradiance and a portion of the first amount of direct normal irradiance. If the first amount of diffuse horizontal irradiance does not exceed the first amount of direct normal irradiance, the at least one processor is programmed to calculate the first angle for the tracker based on a position of the sun associated with the first specific point in time and the plurality of positional and solar tracking information. The at least one processor is further programmed to transmit instructions to the rotational mechanism to change the plane of the tracker to the first angle.

In some embodiments, a method for operating a tracker is provided. The method is implemented by at least one processor in communication with at least one memory device. The method includes storing, in the at least one memory device, a plurality of positional and solar tracking information. The method also includes detecting a first amount of diffuse horizontal irradiance (DHI) and a first amount of direct normal irradiance (DNI) at a first specific point in time. If the first amount of diffuse horizontal irradiance exceeds the first amount of direct normal irradiance, the method further includes calculating a first angle for the tracker to maximize an amount of irradiance received by the tracker. The tracker receives a portion of the first amount of diffuse horizontal irradiance and a portion of the first amount of direct normal irradiance. If the first amount of diffuse horizontal irradiance does not exceeds the first amount of direct normal irradiance, the method also includes calculating the first angle for the tracker based on a position of the sun associated with the first specific point in time and the plurality of positional and solar tracking information. Furthermore, the method includes transmitting instructions to a rotational mechanism to change a plane of the tracker to the first angle.

In further embodiments, a controller for a tracker is provided. The controller includes at least one processor in communication with at least one memory device. The at least one processor is programmed to store, in the at least one memory device, a plurality of positional and solar tracking information. The at least one processor is also programmed to detect a first amount of diffuse horizontal irradiance (DHI) and a first amount of direct normal irradiance (DNI) at a first specific point in time. If the first amount of diffuse horizontal irradiance exceeds the first amount of direct normal irradiance, the at least one processor is programmed to calculate a first angle for the tracker to maximize an amount of irradiance received by the tracker. The tracker receives a portion of the first amount of diffuse horizontal irradiance and a portion of the first amount of direct normal irradiance. If the first amount of diffuse horizontal irradiance does not exceed the first amount of direct normal irradiance, the at least one processor is also programmed to calculate the first angle for the tracker based on a position of the sun associated with the first specific point in time and the plurality of positional and solar tracking information. Furthermore, the at least one processor is programmed to transmit instructions to a rotational mechanism to change a plane of a tracker to the first angle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

The systems and processes are not limited to the specific embodiments described herein. In addition, components of each system and each process can be practiced independent and separate from other components and processes described herein. Each component and process also can be used in combination with other assembly packages and processes.

Figure 1:
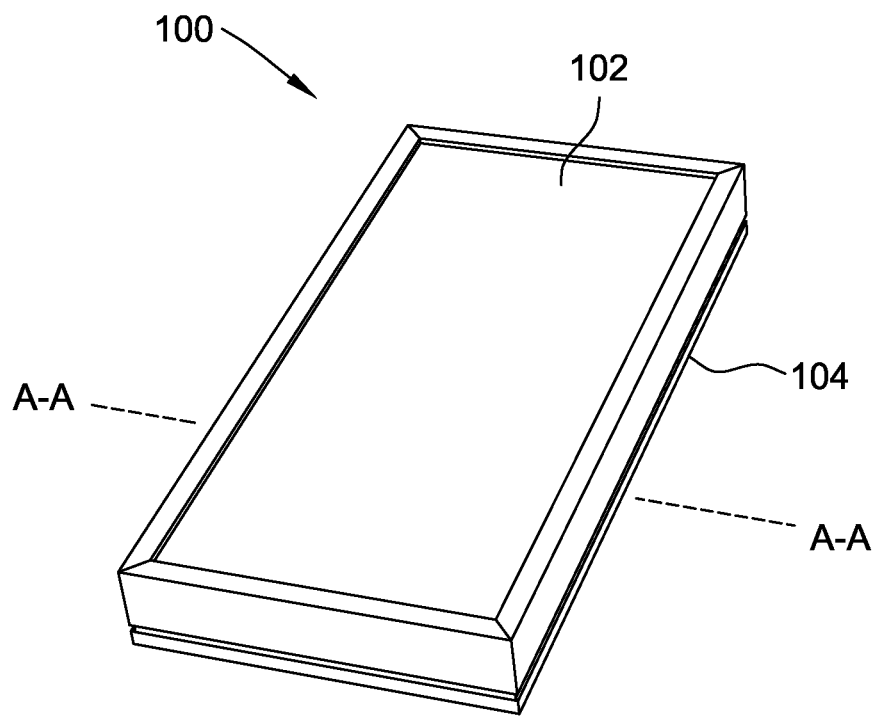
FIG. 1 is a perspective view of a solar module of a solar tracker.
Figure 2:
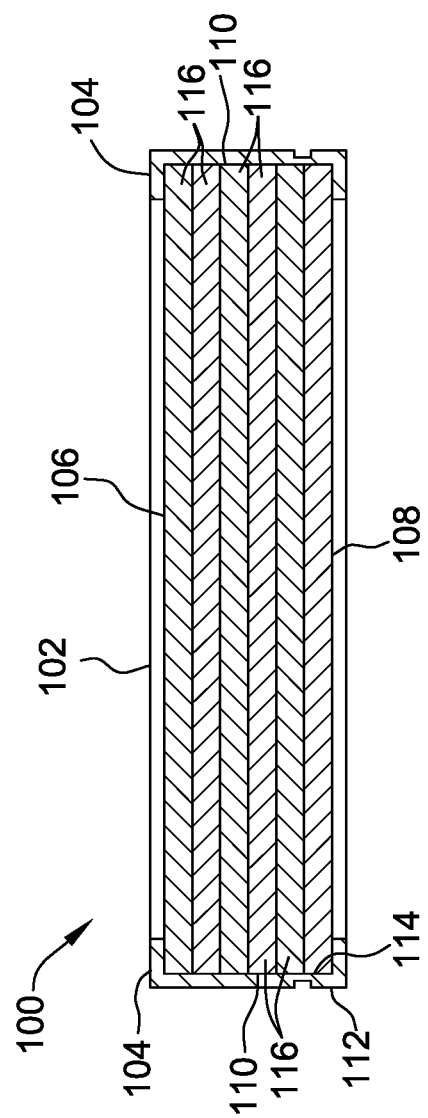
FIG. 2 is a cross-sectional view of the solar module taken along line A-A of FIG. 1.

FIG. 1 is a perspective view of a solar module 100 of a solar tracker. FIG. 2 is a cross-sectional view of the solar module 100 (shown in FIG. 1) taken along line A-A of FIG. 1.

The module 100 includes a top surface 106 and a bottom surface 108. Edges 110 extend between the top surface 106 and the bottom surface 108. Module 100 is rectangular shaped. In other embodiments, module 100 may have any shape that allows the module 100 to function as described herein.

A frame 104 circumscribes and supports the module 100. The frame 104 is coupled to the module 100, for example as shown in FIG. 2. The frame 104 protects the edges 110 of the module 100. The frame 104 includes an outer surface 112 spaced from one or more layers 116 of the module 100 and an inner surface 114 adjacent to the one or more layers 116. The outer surface 112 is spaced from, and substantially parallel to, the inner surface 114. The frame 104 may be made of any suitable material providing sufficient rigidity including, for example, metal or metal alloys, plastic, fiberglass, carbon fiber, and other material capable of supporting the module 100 as described herein. In some embodiments, the frame is made of aluminum, such as 6000 series anodized aluminum.

In the illustrated embodiment, the module 100 is a photovoltaic module. The module 100 has a laminate structure that includes a plurality of layers 116. Layers 116 include, for example, glass layers, non-reflective layers, electrical connection layers, n-type silicon layers, p-type silicon layers, backing layers, and combinations thereof. In other embodiments, the module 100 may have more or fewer layers 116 than shown in FIG. 2, including only one layer 116. The photovoltaic module 100 may include a plurality of photovoltaic modules with each module made of photovoltaic cells.

In some embodiments, the module 100 is a thermal collector that heats a fluid such as water. In such embodiments, the module 100 may include tubes of fluid which are heated by solar radiation. While the present disclosure may describe and show a photovoltaic module, the principles disclosed herein are also applicable to a solar module 100 configured as a thermal collector or sunlight condenser unless stated otherwise.

The module 100 is configured to collect both direct normal irradiance (DNI) (otherwise known as beam irradiance) and diffuse horizontal irradiance (DHI). The DNI represents the solar irradiance received that came in a straight line from the sun. The DHI represents the irradiance received that does not arrive in a direct path from the sun. This irradiance has been scattered by molecules and particles in the atmosphere and comes equally from all directions.

Figure 3:
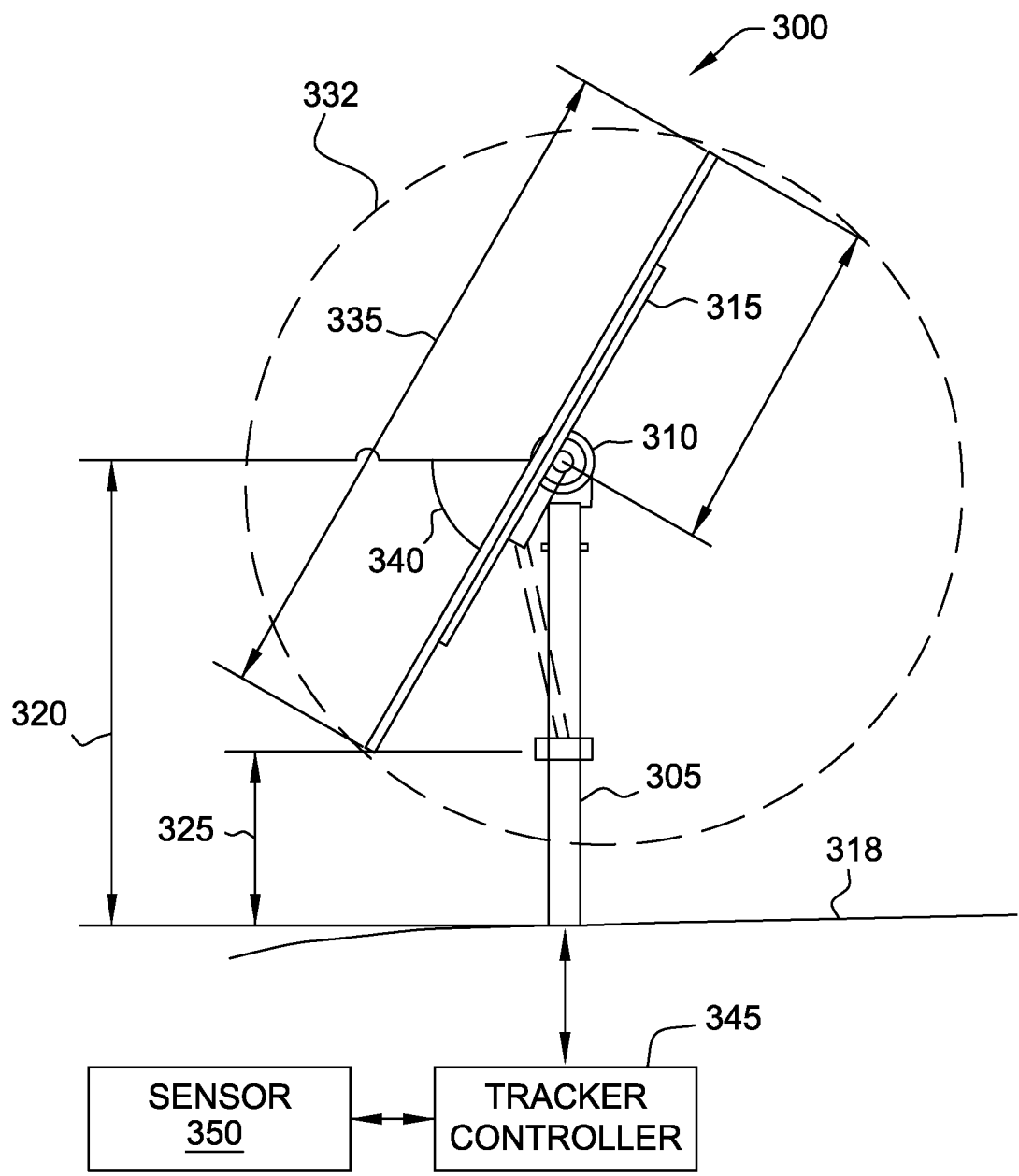
FIG. 3 is a side view of a solar tracker in an example of the present disclosure.

FIG. 3 is a side view of a tracker 300 in an example of the present disclosure. The tracker 300 includes support columns 305, one or more rotational mechanisms 310, and a tracker panel 315. The tracker panel 315 includes from one to a plurality of modules 100 (shown in FIG. 1) for collecting solar irradiance. The tracker 300 (also known as a tracker row) controls the position of the plurality of modules 100 on the tracker panel 315. The rotational mechanism 310 is configured to rotate the tracker panel 315 to different angles 340 to track the sun as described herein. The tracker controller 345 transmits instructions to the rotational mechanism 310 to change the plane of the tracker 300. As used herein the plane of the tracker 300 is the top surface 106 (shown in FIG. 2) of the tracker panel 315 (shown in FIG. 3). The rotational mechanism 310 rotates the tracker panel 315 along a single axis where a range of motion 332 for the tracker panel 315 can include angles 340 from −60 degrees to 60 degrees, where zero degrees is horizontal. Rotational mechanism 310 can be any rotational mechanism 310 able to move the tracker panel 315 between angles 340 as described herein. In FIG. 3, the tracker panel 315 is at −60 degrees. The rotational mechanism 310 can be capable of moving a single tracker panel 315, an entire row of tracker panels 315, or a group of tracker panels 315. In some embodiments, each tracker 300 is associated with its own rotational mechanism 310. The rotational mechanism 310 can include, but is not limited to, linear actuators and slew drives.

Tracker 300 is configured so that the top of the tracker 300 (measured at the top of the support column 305) is positioned a height 320 above the ground 318. The height 320 is configured so that the tracker panel 315 of the tracker 300 does not touch the ground 318 while traversing the range of motion 332. To ensure that the tracker panel 315 does not touch the ground 318 at the ends of the range of motion 332, the height 320 also includes a safety margin 325. Safety margin 325 ensures that the tracker panel 315 of the tracker 300 does not reach the ground 318 when at the extremes of its range of motion 332.

The tracker 300 is in communication with a tracker controller 345. The tracker controller 345 instructs the tracker 300 at which angle 340 to position the tracker panel 315. The tracker controller 345 is programmed to determine the position of the sun and calculate the corresponding angle 340 of the tracker panel 315 in this embodiment. The tracker controller 345 is programmed to ensure that the angle 340 of the tracker panel 315 is within the range of motion 332. The tracker controller 345 can be in communication with and in control of a single tracker 300 or a plurality of trackers 300. The tracker controller 345 can be in communication with and in control of all of the trackers 300 in a row of trackers 300.

For each tracker 300, the tracker controller 345 provides solar tracking to maximize the solar irradiance collected by the tracker 300. The tracker controller 345 determines the sun's position with respect to the center of the tracker 300. The tracker controller 345 stores the latitude, longitude, and altitude of the tracker 300. In at least one embodiment, the tracker controller 345 uses the National Renewable Energy Lab's (NREL) equations to calculate the sun's position at any given point in time. In alternative embodiments, the tracker controller 345 is in communication with one or more sensors 350 capable of determining the sun's current position. The tracker controller 345 is programmed to maximize the energy yield for the tracker 300 by minimizing the angle between the sun vector and the normal vector of the plane of the tracker panel 315.

The tracker controller 345 instructs the rotational mechanism 310 to adjust the plane of the tracker panel 315 to be at angle 340, so that the plane of the tracker panel 315 does not deviate by more than +/−1 degree while tracking the sun. In some embodiments, the tracker controller 345 provides a step size to the angle 340 of the plane of the tracker panel 315 of two degrees. This means that the tracker controller 345 adjusts the plane of the tracker panel 315 for every two degrees the sun moves. The tracker controller 345 can adjust the angle 340 of the plane of the tracker panel 315 by any amount, limited by the mechanical tolerances of the tracker 300 and the rotational mechanism 310. In some embodiments, the tracker controller 345 instructs the rotational mechanisms 310 to adjust each tracker panel 315 individually, where different tracker panels 315 in the same row may be adjusted to different angles 340. In other embodiments, the tracker controller 345 instructs that all of the tracker panels 315 in a row should be adjusted to the same angle 340. In some further embodiments, the tracker controller 345 may transmit instructions to trackers 300 in different rows. For example, a tracker controller 345 may control trackers 300 in two adjacent rows.

The tracker controller 345 tracks the sun to know its position with respect to the center of the tracker 300. The tracker controller 345 can determine the center to be the center of an individual tracker 300, the center of a plurality of rows of trackers 300 (also known as an array), and the center of an entire site of trackers 300. To calculate the sun's position, the tracker controller 345 takes into account latitude, longitude, altitude, the exact date, and time. The tracker controller 345 can determine the sun's current position or the sun's position a point in time in the future. The tracker controller 345 uses position of the sun determine an angle 340 where the normal vector of the tracker panel 315 will be as close as possible to the sun's vector as possible. The tracker controller 345 is programmed to adjust the tracker panel 315 when the sun has moved beyond a predetermined threshold, such as, but not limited to, two degrees; therefore, the tracker controller 345 calculates the angle 340 for the tracker panel 315 to be where the angle 340 is closest to the solar vector for the time between adjustments. For example, if the sun vector is at −37 degrees and the sun is rising, the tracker controller 345 can adjust the tracker panel 315 to be at −36 degrees. This provides the maximum coverage while the sun travels from −37 degrees to −35 degrees. During the span of a day, the tracker panel 315 travels from −60 degrees to 60 degrees while following the sun. In other examples, the tracker controller 345 is programmed to adjust the tracker panel 315 when a predetermined period of time has passed.

In the above situation, the tracker 300 is collecting direct normal irradiance (DNI). The tracker 300 also collects diffuse horizontal irradiance (DHI), which comes in from every angle. In most situations where the sky is clear and the sun is visible, the DNI coming directly from the sun greatly exceeds the DHI. In these situations, the tracker controller 345 ensures that the tracker panel 315 is pointed towards the sun to collect the maximum irradiance available.

During conditions where the sun is not visible, such as a cloudy or overcast day, the diffuse horizontal irradiance (DHI) can exceed the direct normal irradiance (DNI). In these conditions, some trackers 300 are set to a horizontal position to collect the DHI. However, there can still be an amount of DNI coming through the clouds or the DHI can be stronger at certain angles based on the current position of the sun. Accordingly the tracker controller 345 can calculate the angle 340 which provides the most irradiance possible. This is illustrated in the process 500 shown in FIG. 5. The tracker controller 345 can determine the amount of DNI and DHI based on one or more sensors 350. The sensors 350 can be, but are not limited to, a pyranometer, a thermopile sensor, a photovoltaic device with a diffuser, a photovoltaic reference cell, and pyrheliometer.

The sensor 350 can be associated with the individual tracker 300 or a group of trackers 300. The sensor 350 is capable of detecting the current amount of DHI either directly or indirectly based on one or more calculations. The tracker controller 345 can also receive the amount of DHI and DNI from a remote computer device, such as a satellite weather monitoring system or other forecasting computer device.

Figure 4:
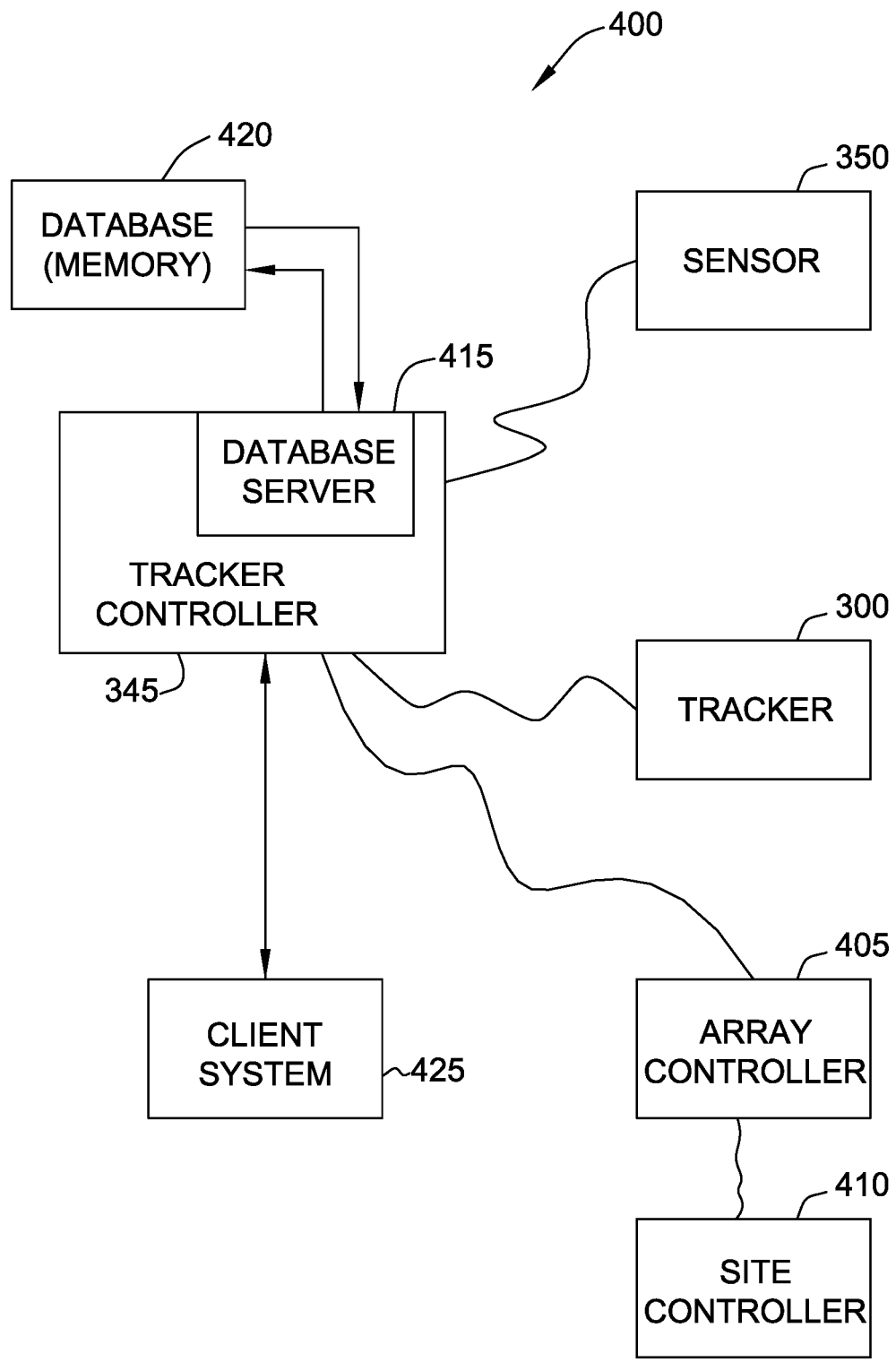
FIG. 4 illustrates an example system for adjusting the solar tracker shown in FIG. 3 for diffuse irradiance conditions.

FIG. 4 illustrates an example system 400 for adjusting the solar tracker 300 (shown in FIG. 3) for diffuse irradiance conditions. The system 400 is used for controlling trackers 300. The system 400 is a tracker controlling computer system 400 that includes at least one tracker controller 345 configured to control the angle 340 of the tracker panel 315 (both shown in FIG. 3) of a tracker 300. In some examples, the tracker controller 345 is programmed to control a plurality of trackers 300 based on data received from one or more sensors 350.

Trackers 300 are configured to track the positon of the sun to collect solar irradiance. As described herein, trackers 300 are associated with a rotational mechanism 310 which rotates the tracker panel 315 (both shown in FIG. 3) of modules 100 (shown in FIG. 1) to track the position of the sun.

In system 400, sensors 350 receive signals about the conditions around the tracker 300, such as the amount of direct and diffuse irradiance. The sensors 350 can include, but are not limited to, a pyranometer, a thermopile sensor, a photovoltaic device with a diffuser, a photovoltaic reference cell, pyrheliometer, or any other sensor 350 that allows the tracker 300 to work as described herein. The sensors 350 can also include an optical sensor for detecting the current position of the sun. Sensors 350 connect to tracker controller 345 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. Sensors 350 receive data about the current conditions at the location of the tracker 300. The sensors 350 can be associated with individual trackers 300, an entire row of trackers 300, an entire array of trackers 300, and/or an entire site. In other examples, sensors 350 are in communication with an array controller 405 and/or a site controller 410, and the sensor information or data describing the sensor information is thereby transmitted to the tracker controller 345.

Array controllers 405 are computers that include a web browser or a software application, which enables array controller 405 to communicate with one or more of tracker controller 345, another array controller 405, and site controller 410 using the Internet, a local area network (LAN), or a wide area network (WAN). In some examples, the array controllers 405 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Array controllers 405 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. Array controllers 405 are computing devices for monitoring a plurality of tracker controllers 345 in communication with a plurality of trackers 300.

Site controllers 410 are computers that include a web browser or a software application, which enables site controller 410 to communicate with one or more of tracker controller 345, array controller 405, and client system 425 using the Internet, a local area network (LAN), or a wide area network (WAN). In some examples, the site controllers 410 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Site controllers 410 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. Site controllers 410 are computing devices for monitoring a plurality of array controllers 405, which are each in communication with a plurality of tracker controllers 345. The site controller 410 and/or the array controller 405 can provide information to the tracker controller 345 such as, but not limited to, DNI, DHI, weather information, forecast information, sun position information, and other information to allow the tracker controller 345 to operate as described herein.

Client systems 425 are computers that include a web browser or a software application, which enables client systems 425 to communicate with one or more of tracker controller 345, array controller 405, and site controller 410 using the Internet, a local area network (LAN), or a wide area network (WAN). In some examples, the client systems 425 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 425 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. Client system 425 can provide information to the tracker controller 345 such as, but not limited to, current and forecasted DNI and DHI amounts.

A database server 415 is communicatively coupled to a database 420 that stores data. In one example, the database 420 is a database that includes, but is not limited to, the forecasted DNI, forecasted DHI, latitude, longitude, and altitude of the site, the current time, range of motion 332 (shown in FIG. 3), and the current sun position based on the exact date, time, latitude, longitude, and altitude. In some examples, the database 420 is stored remotely from the tracker controller 345. In some examples, the database 420 is decentralized. In the example, a person can access the database 420 via the client system 425 by logging onto one of tracker controller 345, array controller 405, and site controller 410.

Figure 5:
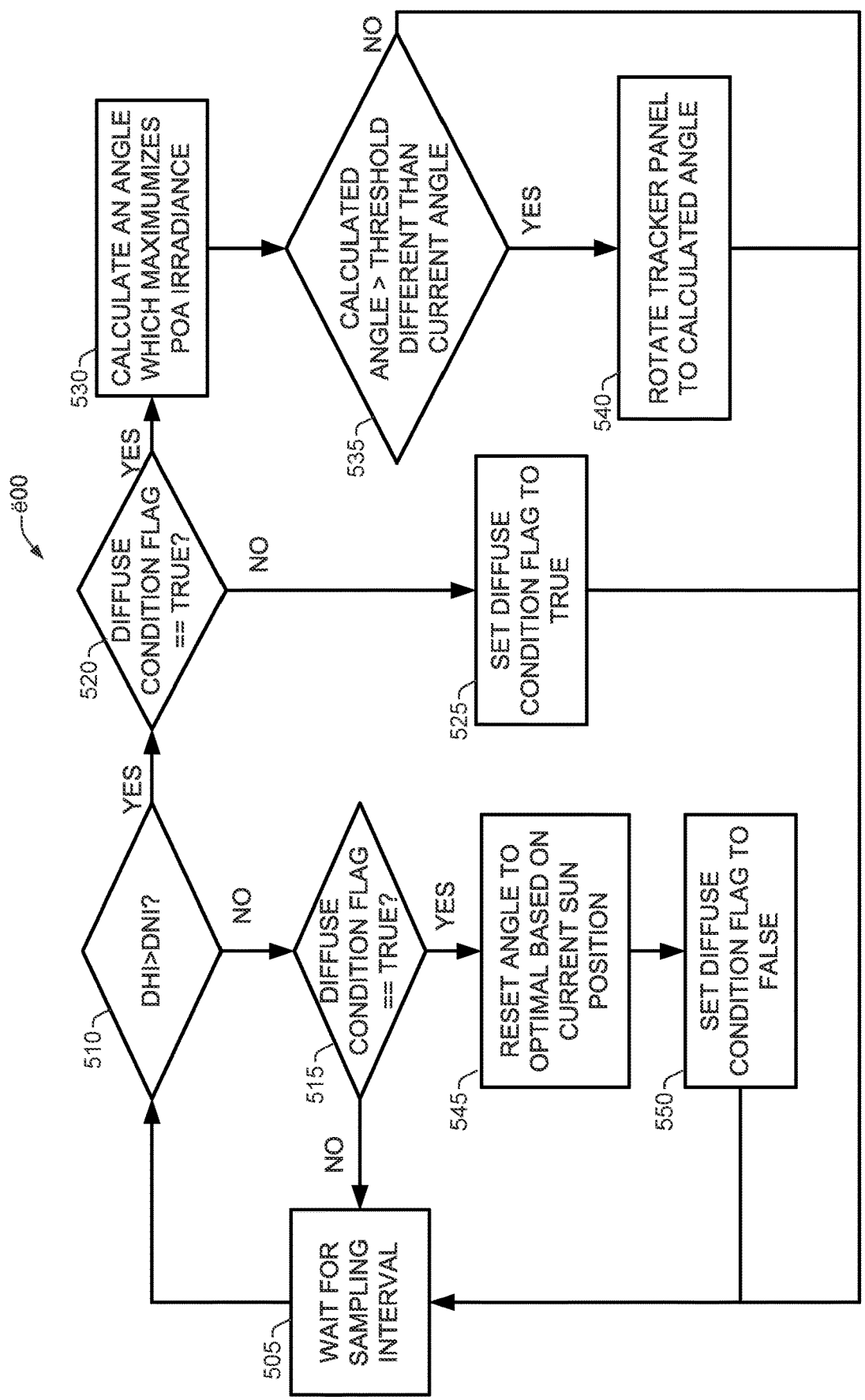
FIG. 5 illustrates an example process for adjusting the solar tracker shown in FIG. 3 for diffuse irradiance conditions using the system shown in FIG. 4.

FIG. 5 illustrates an example process 500 for adjusting the solar tracker 300 (shown in FIG. 3) for diffuse irradiance conditions using the system 400 (shown in FIG. 4). In this embodiment, process 500 is performed by the tracking controller 345 (shown in FIG. 3). Process 500 includes steps to maximize the amount of irradiance collected during changing weather conditions.

The tracker controller 345 waits 505 for a sampling interval. The sampling interval creates a time delay in responding to changes in conditions to ensure that the changes are sustained. This allows the system 400 to avoid unnecessary movement and wear on the tracker 300 due to transient weather conditions. For example, the tracker controller 345 would not respond when a cloud temporarily obscures the sun during a mostly clear day. The sampling period can be set by a user or may be based on a weather forecast. In situations where the weather may be changing quickly, the sampling period can be set to a low value. In situations where the weather is very consistent, the sampling period can be set to a high value. The sampling period can also be based on current wind speed. The sampling period can also have built in maximum and minimum values. In one example, the sampling period can be set to an arbitrary value, such as five minutes. In another example, the sampling period can be based on the amount of time required for the current angle of the sun to change a predetermined number of degrees in the sky.

When the sampling interval has expired, the tracker controller 345 determines 510 if the diffuse horizontal irradiance (DHI) exceeds direct normal irradiance (DNI). The tracker controller 345 can calculate both the DNI and the DHI. This can be from direct sensor observations, from indirect sensor information, or from outside sources. The calculation can also be for the DNI and DHI over a period of time. The tracker controller 345 can receive forecast information for a specific period of time, such as 10 minutes, 30 minutes, or an hour, for example. The tracker controller 345 can also include a buffer value in its calculations, so that the DHI needs to exceed the DNI by a certain amount to proceed to Step 520. The tracker controller 345 can use that forecast information to determine the amounts of DNI and DHI over that period, such as by calculating the median, mean, and/or mode amounts. Based on the calculated DNI and DHI, the tracker controller 345 determines 510 if the DHI exceeds the DNI. If the DHI does not exceed the DNI, then the tracker controller 345 determines 515 if the Diffuse Condition Flag is set to true. If not, then the tracker controller 345 proceeds to Step 505 and waits 505 for a period of time equal to the current sampling period.

If the DHI exceeds the DNI, the tracker controller 345 determines 520 if the Diffuse Condition Flag is set to true. If the flag is not set, then the tracker controller 345 sets 525 the Diffuse Condition Flag to true and returns to Step 505 to wait for the sampling period. By waiting another waiting period before making changes, the tracker controller 345 ensures that it doesn't make changes to the angle 340 of the tracker panel 315 due to transient conditions, such as a single cloud covering the sun at the point that the measurements of DNI and DHI were taken.

If the Diffuse Condition Flag is set to true, the tracker controller 345 calculates 530 an angle 340 that maximizes the amount of plane of array (POA) irradiance collected based on both DHI and DNI. The tracker controller 345 can calculate 530 the angle for the maximum POA irradiance by performing calculations for every angle 340 from the current angle 340 of the tracker panel 315 to zero, where the tracker panel 315 is horizontal. The tracker panel 315 can calculate 530 the angle 340 based on one or more of, the tracker panel 315 tilt from the horizon, the panel's azimuth from north, the solar zenith angle, the solar azimuth angle, the direct normal irradiance, the global horizontal irradiance, the diffuse horizontal irradiance, the extraterrestrial direct normal irradiance, the air mass, the surface albedo, the surface type, and the sky diffuse model being used. The total irradiance collected is shown in Equation 1.

$$I_{tot} = I_{beam} + I_{skydiffuse} + I_{ground} \qquad \text{EQ. 1}$$

where $I_{tot}$ is the total irradiance, $I_{beam}$ is the direct irradiance (DNI), $I_{skydiffuse}$ is the diffuse irradiance from the sky, and $I_{ground}$ is the irradiance reflected from the ground.

The tracker controller 345 determines 535 if the calculated angle 340 from Step 530 is more than a predetermined threshold of degrees, such as two degrees, different from the current angle 340 of the tracker panel 315. If the difference between the calculated angle 340 and the current angle 340 is greater than the predetermined threshold, the tracker controller 345 instructs the rotational component 310 to rotate the plane of tracker panel 315 to the calculated angle 340. As used herein the plane of the tracker 300 is the top surface 106 (shown in FIG. 2) of the tracker panel 315. Then the tracker controller 345 proceeds to Step 505 to wait for the sampling interval. If the difference between the calculated angle 340 and the current angle 340 is not greater than the predetermined threshold, the tracker controller 345 leaves the tracker panel 315 at its current angle 340 and proceeds to Step 505 to wait for the sampling interval. The predetermined threshold of difference between the current angle 340 and the calculated angle 340 can be any difference in angles based on user preferences or other conditions.

When the conditions change and the DNI exceeds the DHI, the tracker controller 345 determines 515 if the Diffuse Condition Flag is set to true. If so, the tracker controller 345 resets 545 the angle 340 to the optimal angle 340 based on the current position of the sun. The tracker controller 345 sets 550 the Diffuse Condition Flag to false.

While process 500 is occurring, the tracker controller 345 is also executing the algorithm to update the positon of the tracker panel 315 based on the current position of the sun. However, when the Diffuse Condition Flag is set to true, the tracker controller 345 does not update the angle 340 of the tracker panel 315 based on the sun tracking algorithm.

For example, the tracker 300 is in a period of direct sunlight. In this example, the Diffuse Condition Flag is currently set to false. The tracker controller 345 is tracking the sun and ensuring that the tracker panel 315 is pointed towards the sun. The tracker controller 345 determines a position of the sun and calculates the angle based on the position of the sun and one or more of, the latitude, longitude, and altitude of the site, the current time, range of motion 332, and the sun position based on exact date, time, latitude, longitude, and altitude.

After the sampling period has passed, the tracker controller 345 calculates the DNI and DHI. This can be the current or forecasted values for both. The tracker controller 345 determines 510 that the DHI is not greater than the DNI. The tracker controller 345 also determines 515 that the Diffuse Condition Flag is set to false and proceeds to Step 505. While process 500 is occurring, the tracker controller 345 is also executing the algorithm to update the positon of the tracker panel 315 based on the current position of the sun.

In this example, the conditions begin to change to cloudy. The next time that the tracker controller 345 calculates the DNI and DHI, the tracker controller 345 determines 510 that the DHI value is greater than the DNI value. The tracker controller 345 determines 520 that the Diffuse Condition Flag is set to false. The tracker controller 345 sets 525 the Diffuse Condition Flag to true and proceeds to Step 505 to wait 505 for the sampling interval.

Once the sampling interval has passed, the tracker controller 345 determines 510 that DHI still exceeds DNI. The tracker controller 345 also determines 520 that the Diffuse Condition Flag is set to true. Then the tracker controller 345 calculates 530 an angle 340 for the tracker panel 315 that maximizes POA irradiance collected. The tracker controller 345 determines 535 if the calculated angle 340 is more than a predetermined threshold different from the current angle 340. If the calculated angle 340 is more than the predetermined threshold different from the current angle 340, the tracker controller 345 instructs the rotational mechanism 310 to rotate the tracker panel 315 to the calculated angle. In some embodiments, the predetermined threshold is two degrees; however, the predetermined threshold can be any difference in angles based on user preferences or other conditions.

In cases where the Diffuse Condition Flag is set to true, the tracker controller 345 stops executing the solar trading algorithm to update the positon of the tracker panel 315 based on the current position of the sun based on direct beam irradiance.

When the conditions change to clearer skies and the DNI exceeds the DHI, the tracker controller 345 determines 515 if the Diffuse Condition Flag is set to true. If so, the tracker controller 345 resets 545 the angle 340 to the optimal angle 340 based on the current position of the sun using an angle 340 calculated by the sun tracking algorithm. The tracker controller 345 also sets 550 the Diffuse Condition Flag to false.

Figure 6:
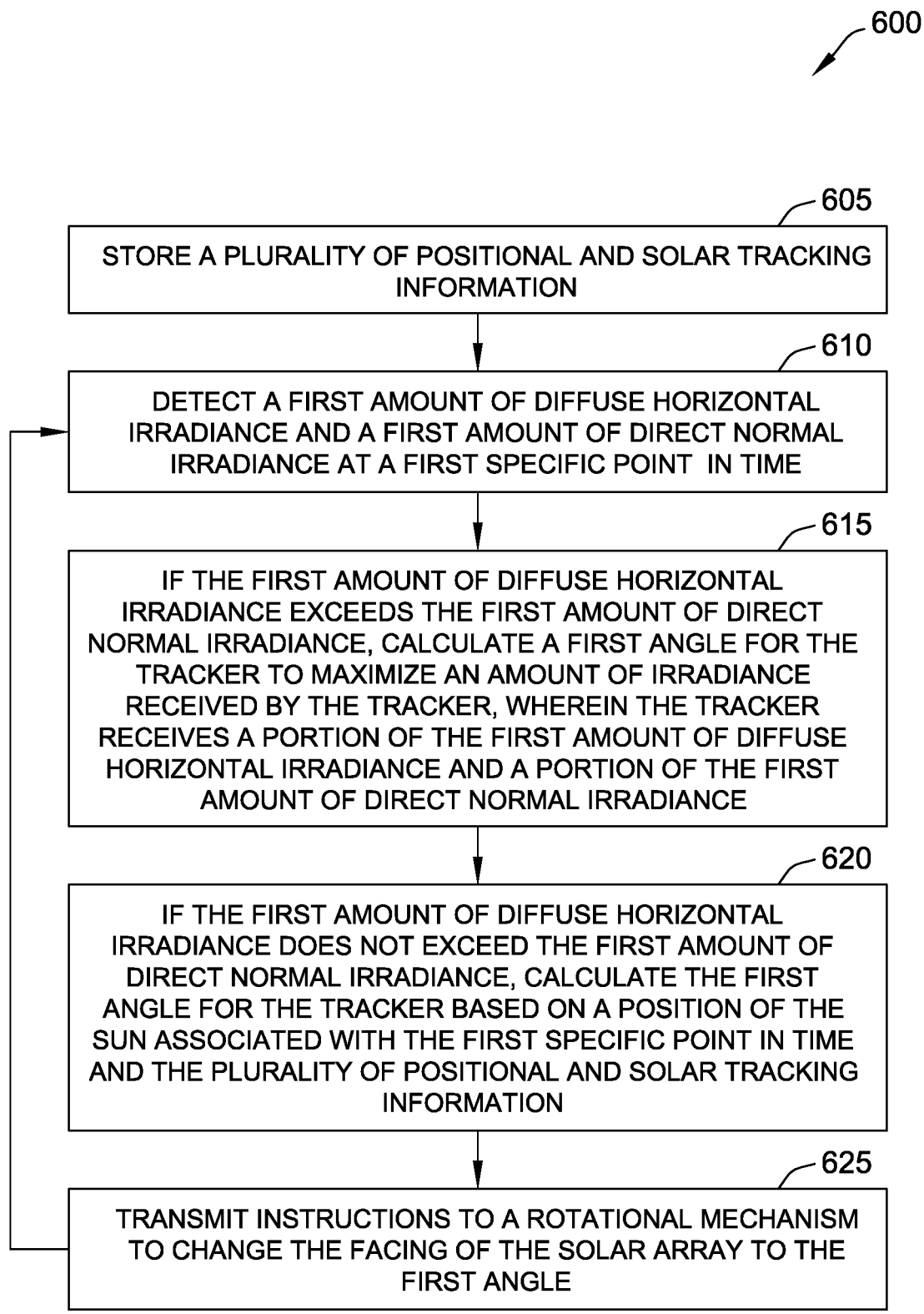
FIG. 6 illustrates another example process for adjusting the solar tracker shown in FIG. 3 for diffuse irradiance conditions using the system shown in FIG. 4.

FIG. 6 illustrates another example process 600 for adjusting the solar tracker 300 (shown in FIG. 3) for diffuse irradiance conditions using the system 400 (shown in FIG. 4). In this embodiment, process 600 is performed by the tracking controller 345 (shown in FIG. 3). Process 600 includes steps to maximize the amount of irradiance collected during changing weather conditions.

The tracker controller 345 stores 605 a plurality of positional and solar tracking information in at least one memory device, such as database 420 (shown in FIG. 4). This information can include, but is not limited to, the latitude, longitude, and altitude of the site, the current time, range of motion 332, and the sun position based on exact date, time, latitude, longitude, and altitude.

The tracker controller 345 detects 610 detect a first amount of diffuse horizontal irradiance (DHI) and a first amount of direct normal irradiance (DNI) at a first specific point in time. The first amount of DHI and DNI can be detected 610 based on sensor information received from one or more sensors 350 (shown in FIG. 3). The first amount of DHI and DNI can be detected 610 based on forecast information received from a remote computer device, such as, but not limited to, array controller 405, site controller 410, and client system 425 (all shown in FIG. 4). The first amount of DHI and DNI can be detected 610 based on the received forecast information over a period of time, such as 30 minutes.

If the first amount of diffuse horizontal irradiance exceeds the first amount of direct normal irradiance, the tracker controller 345 calculates 615 a first angle 340 (shown in FIG. 3) for the tracker 300 to maximize an amount of POA irradiance received by the tracker 300. At the first angle 340 the tracker 300 receives a portion of the first amount of diffuse horizontal irradiance and a portion of the first amount of direct normal irradiance. The portion of the first amount of diffuse horizontal irradiance received is greater than the portion of the first amount of direct normal irradiance received. The tracker controller 345 calculates 615 an amount of POA irradiance collected for each angle 340 of a plurality of angles 340 between a current angle of the tracker 300 and a horizontal angle 340 for the tracker 300. The tracker controller 345 identifies the first angle 340 of the plurality of angles 340 based on a comparison of the corresponding amounts of irradiance, where the first angle 340 is associated with a maximum amount of irradiance collected of the plurality of angles 340.

If the first amount of diffuse horizontal irradiance does not exceed the first amount of direct normal irradiance, the tracker controller 345 calculates 620 the first angle 340 for the tracker 300 based on a position of the sun associated with the first specific point in time and the plurality of positional and solar tracking information.

The tracker controller 345 transmits 625 instructions to the rotational mechanism 310 (shown in FIG. 3) to change the plane of the tracker 300 to the first adjusted angle 340.

As used herein the plane of the tracker 300 is the top surface 106 (shown in FIG. 2) of the tracker panel 315 (shown in FIG. 3).

The tracker controller 345 detects a second amount of diffuse horizontal irradiance (DHI) and a second amount of direct normal irradiance (DNI) at a second specific point in time. If the second amount of diffuse horizontal irradiance exceeds the second amount of direct normal irradiance, the tracker controller 345 calculates a second angle 340 for the tracker 300 so that the tracker 300 receives a portion of the second amount of diffuse horizontal irradiance and a portion of the second amount of direct normal irradiance. If the second amount of diffuse horizontal irradiance does not exceed the second amount of direct normal irradiance, the tracker controller 345 calculates the second angle 340 for the tracker based on a position of the sun associated with the second specific point in time and the plurality of positional and solar tracking information. The tracker controller 345 transmits instructions to the rotational mechanism 310 to change the plane of the tracker 300 to the second angle 340.

The tracker controller 345 is constantly repeating Steps 610 to 625 to ensure that the tracker panel 315 is kept at an optimal angle 340 to collect solar energy during the diffuse and non-diffuse time periods. The tracker controller 345 waits a predetermined period of time between detecting the first amount of diffuse horizontal irradiance and detecting the second amount of diffuse horizontal irradiance The tracker controller 345 also repeats steps 610 to 625 to change the plane of the tracker 300 once conditions have changed. The tracker controller 345 determines if a difference between a current angle of the tracker and the first angle exceeds a predetermined threshold. If the difference exceeds the predetermined threshold, the tracker controller 345 transmits instructions to the rotational mechanism 310 to change the plane of the tracker 300 to the first angle 340.

The tracker controller 345 can also determine if a diffuse condition flag is set to true. If the first amount of diffuse horizontal irradiance exceeds the first amount of direct normal irradiance and the diffuse condition flag is set to false, the tracker controller 345 sets the diffuse condition flag to true. The tracker controller 345 also sets the diffuse condition flag to false if the first amount of diffuse horizontal irradiance does not exceeds the first amount of direct normal irradiance and the diffuse condition flag is set to true.

Figure 7:
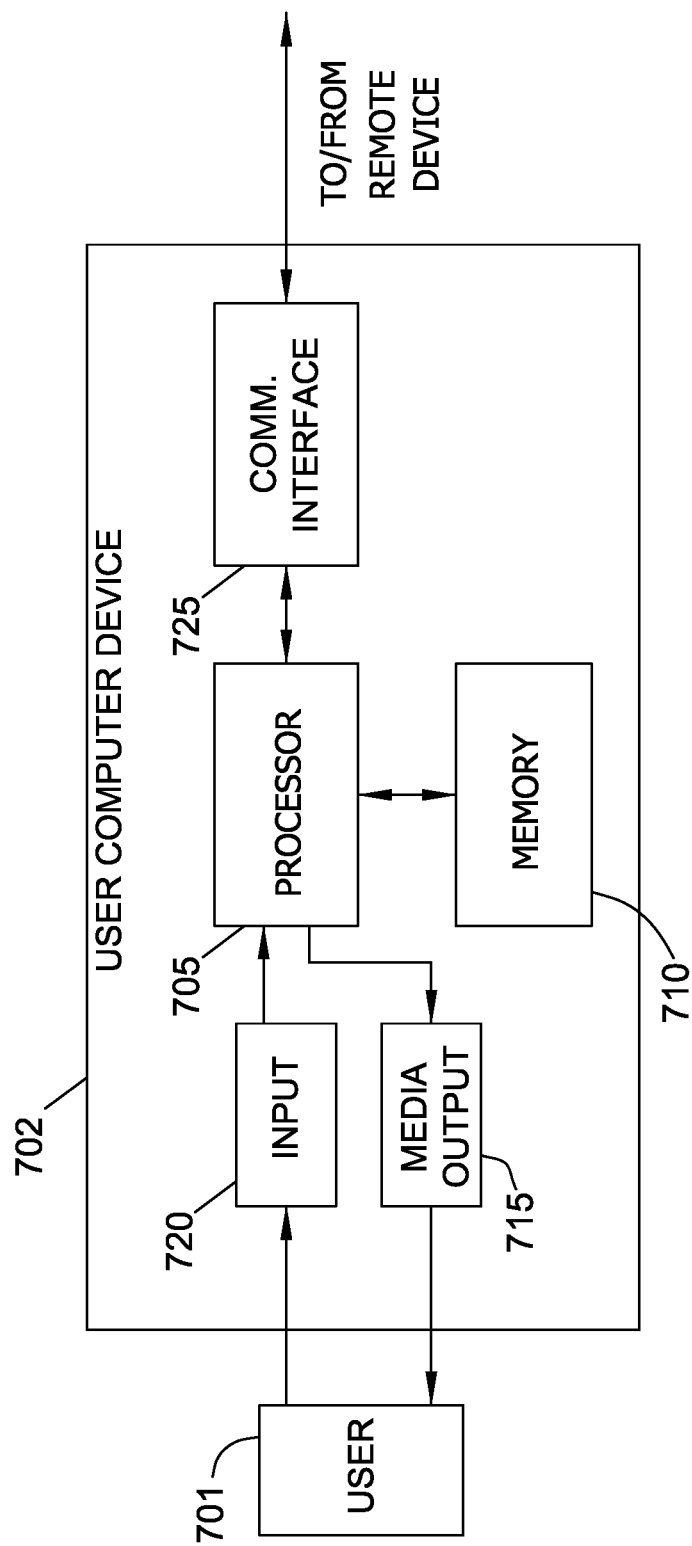
FIG. 7 illustrates an example configuration of a user computer device used to perform the processes shown in FIGS. 5 and 6.

FIG. 7 illustrates an example configuration of a user computer device 702 used to perform the processes 500 and 600 (shown in FIGS. 5 and 6). User computer device 702 is operated by a user 701. The user computer device 702 can include, but is not limited to, the tracker controller 345, sensor 350 (both shown in FIG. 3), the array controller 405, the site controller 410, and the client system 424 (all shown in FIG. 4). The user computer device 702 includes a processor 705 for executing instructions. In some examples, executable instructions are stored in a memory area 710. The processor 705 can include one or more processing units (e.g., in a multi-core configuration). The memory area 710 is any device allowing information such as executable instructions and/or transaction data to be stored and retrieved. The memory area 710 can include one or more computer-readable media.

The user computer device 702 also includes at least one media output component 715 for presenting information to the user 701. The media output component 715 is any component capable of conveying information to the user 701. In some examples, the media output component 715 includes an output adapter (not shown) such as a video adapter and/or an audio adapter. An output adapter is operatively coupled to the processor 705 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 715 is configured to present a graphical user interface (e.g., a web browser and/or a client application) to the user 701. A graphical user interface can include, for example, an interface for viewing the performance information about a tracker 300 (shown in FIG. 3). In some examples, the user computer device 702 includes an input device 720 for receiving input from the user 701. The user 701 can use the input device 720 to, without limitation, select to view the performance of a tracker 300. The input device 720 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 715 and the input device 720.

The user computer device 702 can also include a communication interface 725, communicatively coupled to a remote device such as the site controller 410. The communication interface 725 can include, for example, a wired or wireless network adapter and/or a wireless data transceiver for use with a mobile telecommunications network.

Stored in the memory area 710 are, for example, computer-readable instructions for providing a user interface to the user 701 via the media output component 715 and, optionally, receiving and processing input from the input device 720. A user interface can include, among other possibilities, a web browser and/or a client application. Web browsers enable users, such as the user 701, to display and interact with media and other information typically embedded on a web page or a website from the tracker controller 345. A client application allows the user 701 to interact with, for example, the tracker controller 345. For example, instructions can be stored by a cloud service, and the output of the execution of the instructions sent to the media output component 715.

The processor 705 executes computer-executable instructions for implementing aspects of the disclosure. In some examples, the processor 705 is transformed into a special purpose microprocessor by executing computer-executable instructions or by otherwise being programmed. For example, the processor 705 is programmed with instructions such as those shown in FIGS. 5 and 6.

Figure 8:
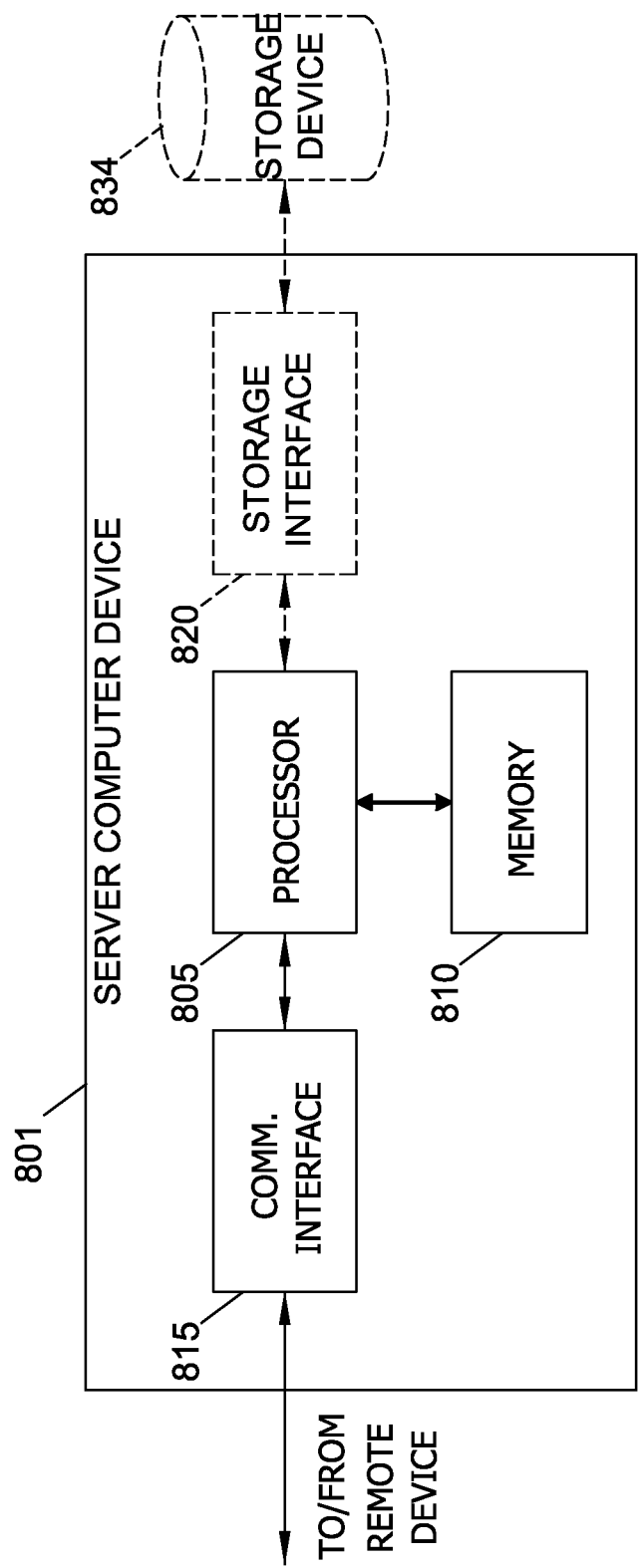
FIG. 8 illustrates an example configuration of the server system used to perform the processes shown in FIGS. 5 and 6.

FIG. 8 illustrates an example configuration of the server system used to perform the processes 500 and 600 (shown in FIGS. 5 and 6). Server computer device 801 can include, but is not limited to, the tracker controller 345 (shown in FIG. 3), the array controller 405, the site controller 410, and the database server 415 (all shown in FIG. 4). The server computer device 801 also includes a processor 805 for executing instructions. Instructions can be stored in a memory area 810. The processor 805 can include one or more processing units (e.g., in a multi-core configuration).

The processor 805 is operatively coupled to a communication interface 815 such that the server computer device 801 is capable of communicating with a remote device such as another server computer device 801, another tracker controller 345, or the client system 425 (shown in FIG. 4). For example, the communication interface 815 can receive requests from the client system 425 via the Internet, as illustrated in FIG. 4.

The processor 805 can also be operatively coupled to a storage device 834. The storage device 834 is any computer-operated hardware suitable for storing and/or retrieving data, such as, but not limited to, data associated with the database 420 (shown in FIG. 4). In some examples, the storage device 834 is integrated in the server computer device 801. For example, the server computer device 801 may include one or more hard disk drives as the storage device 834. In other examples, the storage device 834 is external to the server computer device 801 and may be accessed by a plurality of server computer devices 801. For example, the storage device 834 may include a storage area network (SAN), a network attached storage (NAS) system, and/or multiple storage units such as hard disks and/or solid state disks in a redundant array of inexpensive disks (RAID) configuration.

In some examples, the processor 805 is operatively coupled to the storage device 834 via a storage interface 820. The storage interface 820 is any component capable of providing the processor 805 with access to the storage device 834. The storage interface 820 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 805 with access to the storage device 834.

The processor 805 executes computer-executable instructions for implementing aspects of the disclosure. In some examples, the processor 805 is transformed into a special purpose microprocessor by executing computer-executable instructions or by otherwise being programmed. For example, the processor 805 is programmed with instructions such as those shown in FIGS. 5 and 6.

Described herein are computer systems such as the tracker controller and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers; reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for determining a direction of arrival of a wireless signal. The system and methods described herein address that technical problem. Additionally, at least one of the technical solutions to the technical problems provided by this system may include: (i) improved accuracy in determining proper angles for solar trackers, (ii) improved collection of irradiance during periods of diffuse light; (iii) increased solar irradiance collected during changing weather periods with accumulation; and (iv) up-to-date positioning of solar trackers based on current conditions at the solar site.

The methods and systems described herein may be implemented using computer programming or engineering techniques including computer software, firmware, hardware, or any combination or subset thereof, wherein the technical effects may be achieved by performing at least one of the following steps: a) store, in the at least one memory device, a plurality of positional and solar tracking information; b) detect a first amount of diffuse horizontal irradiance (DHI) and a first amount of direct normal irradiance (DNI) at a first specific point in time, wherein the portion of the first amount of diffuse horizontal irradiance is greater than the portion of the first amount of direct normal irradiance; c) if the first amount of diffuse horizontal irradiance exceeds the first amount of direct normal irradiance, calculate a first angle for the tracker to maximize an amount of irradiance received by the tracker, wherein the tracker receives a portion of the first amount of diffuse horizontal irradiance and a portion of the first amount of direct normal irradiance; d) if the first amount of diffuse horizontal irradiance does not exceed the first amount of direct normal irradiance, calculate the first angle for the tracker based on a position of the sun associated with the first specific point in time and the plurality of positional and solar tracking information; e) transmit instructions to the rotational mechanism to change the plane of the tracker to the first angle; f) detect a second amount of diffuse horizontal irradiance (DHI) and a second amount of direct normal irradiance (DNI) at a second specific point in time; g) if the second amount of diffuse horizontal irradiance exceeds the second amount of direct normal irradiance, calculate a second angle for the tracker so that the tracker receives a portion of the second amount of diffuse horizontal irradiance and a portion of the second amount of direct normal irradiance; h) if the second amount of diffuse horizontal irradiance does not exceed the second amount of direct normal irradiance, calculate the second angle for the tracker based on a position of the sun associated with the second specific point in time and the plurality of positional and solar tracking information; i) transmit instructions to the rotational mechanism to change the plane of the tracker to the second angle; j) wait a predetermined period of time between detecting the first amount of diffuse horizontal irradiance and detecting the second amount of diffuse horizontal irradiance; k) determine if a difference between a current angle of the tracker and the first angle exceeds a predetermined threshold; l) if the difference exceeds the predetermined threshold, transmit instructions to the rotational mechanism to change the plane of the tracker to the first angle; m) calculate an amount of irradiance collected for each angle of a plurality of angles between a current angle of the tracker and a horizontal angle for the tracker; n) identify the first angle of the plurality of angles based on a comparison of the corresponding amounts of irradiance to select one of the plurality of angles with the maximum amount of irradiance received; o) determine if a diffuse condition flag is set to true; p) if the first amount of diffuse horizontal irradiance exceeds the first amount of direct normal irradiance and the diffuse condition flag is set to false, set the diffuse condition flag to true; q) set the diffuse condition flag to false if the first amount of diffuse horizontal irradiance does not exceeds the first amount of direct normal irradiance and the diffuse condition flag is set to true; r) receive sensor information from the one or more sensors; s) detect a first amount of diffuse horizontal irradiance (DHI) and a first amount of direct normal irradiance (DNI) at a first specific point in time based on the received sensor information; t) receive forecast information from a remote computer device; u) detect the first amount of diffuse horizontal irradiance (DHI) and the first amount of direct normal irradiance (DNI) based on the received forecast information; and v) detect the first amount of diffuse horizontal irradiance (DHI) and the first amount of direct normal irradiance (DNI) over a period of time based on the received forecast information.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a tracker attached to a rotational mechanism for changing a plane of the tracker, wherein the tracker is configured to collect solar irradiance; and
a controller in communication with the rotational mechanism, the controller comprising at least one processor in communication with at least one memory device, wherein the at least one processor is programmed to:
detect a first amount of diffuse horizontal irradiance (DHI) and a first amount of direct normal irradiance (DNI) at a first specific point in time;
calculate a first angle for the tracker to maximize an amount of irradiance received by the tracker based on the first amount of diffuse horizontal irradiance, the first amount of direct normal irradiance, and an angle of the sun; and
transmit instructions to the rotational mechanism to change the plane of the tracker to the first angle.

2. The system in accordance with claim 1, wherein the at least one processor is further programmed to:
detect a second amount of diffuse horizontal irradiance (DHI) and a second amount of direct normal irradiance (DNI) at a second specific point in time;
if the second amount of diffuse horizontal irradiance exceeds the second amount of direct normal irradiance, calculate a second angle for the tracker so that the tracker receives a portion of the second amount of diffuse horizontal irradiance and a portion of the second amount of direct normal irradiance;
if the second amount of diffuse horizontal irradiance does not exceed the second amount of direct normal irradiance, calculate the second angle for the tracker based on a position of the sun associated with the second specific point in time; and
transmit instructions to the rotational mechanism to change the plane of the tracker to the second angle.

3. The system in accordance with claim 2, wherein the at least one processor is further programmed to wait a predetermined period of time between detecting the first amount of diffuse horizontal irradiance and detecting the second amount of diffuse horizontal irradiance.

4. The system in accordance with claim 1, wherein the at least one processor is further programmed to:
determine if a difference between a current angle of the tracker and the first angle exceeds a predetermined threshold; and
if the difference exceeds the predetermined threshold, transmit instructions to the rotational mechanism to change the plane of the tracker to the first angle.

5. The system in accordance with claim 1, wherein the portion of the first amount of diffuse horizontal irradiance is greater than the portion of the first amount of direct normal irradiance.

6. The system in accordance with claim 1, wherein the at least one processor is further programmed to:
calculate an amount of irradiance collected for each angle of a plurality of angles between a current angle of the tracker and a horizontal angle for the tracker; and
identify the first angle of the plurality of angles based on a comparison of the corresponding amounts of irradiance to select one of the plurality of angles with the maximum amount of irradiance received.

7. The system in accordance with claim 6, wherein the at least one processor is further programmed to:
determine if a diffuse condition flag is set to true; and
if the first amount of diffuse horizontal irradiance exceeds the first amount of direct normal irradiance and the diffuse condition flag is set to false, set the diffuse condition flag to true.

8. The system in accordance with claim 7, wherein the at least one processor is further programmed to set the diffuse condition flag to false if the first amount of diffuse horizontal irradiance does not exceeds the first amount of direct normal irradiance and the diffuse condition flag is set to true.

9. The system in accordance with claim 1, further comprising one or more sensors, and where the at least one processor is further programmed to:
receive sensor information from the one or more sensors; and
detect a first amount of diffuse horizontal irradiance (DHI) and a first amount of direct normal irradiance (DNI) at a first specific point in time based on the received sensor information.

10. The system in accordance with claim 1, where the at least one processor is further programmed to:
receive forecast information from a remote computer device; and
detect the first amount of diffuse horizontal irradiance (DHI) and the first amount of direct normal irradiance (DNI) based on the received forecast information.

11. The system in accordance with claim 10, wherein the at least one processor is further programmed to detect the first amount of diffuse horizontal irradiance (DHI) and the first amount of direct normal irradiance (DNI) over a period of time based on the received forecast information.

12. A method for operating a tracker, the method implemented by at least one processor in communication with at least one memory device, the method comprises:
detecting a first amount of diffuse horizontal irradiance (DHI) and a first amount of direct normal irradiance (DNI) at a first specific point in time;
calculating a first angle for the tracker to maximize an amount of irradiance received by the tracker based on the first amount of diffuse horizontal irradiance, the first amount of direct normal irradiance, and an angle of the sun; and
transmitting instructions to a rotational mechanism to change a plane of the tracker to the first angle.

13. The method in accordance with claim 12 further comprising:
detecting a second amount of diffuse horizontal irradiance (DHI) and a second amount of direct normal irradiance (DNI) at a second specific point in time;
if the second amount of diffuse horizontal irradiance exceeds the second amount of direct normal irradiance, calculating a second angle for the tracker so that the tracker receives a portion of the second amount of diffuse horizontal irradiance and a portion of the second amount of direct normal irradiance;
if the second amount of diffuse horizontal irradiance does not exceed the second amount of direct normal irradiance, calculating the second angle for the tracker based on a position of the sun associated with the second specific point in time; and
transmitting instructions to the rotational mechanism to change the plane of the tracker to the second angle.

14. The method in accordance with claim 13 further comprising waiting a predetermined period of time between detecting the first amount of diffuse horizontal irradiance and detecting the second amount of diffuse horizontal irradiance.

15. The method in accordance with claim 12 further comprising:
calculating an amount of irradiance collected for each angle of a plurality of angles between a current angle of the tracker and a horizontal angle for the tracker; and
identifying the first angle of the plurality of angles based on a comparison of the corresponding amounts of irradiance to select one of the plurality of angles with the maximum amount of irradiance received.

16. A controller for a tracker, the controller including at least one processor in communication with at least one memory device, the at least one processor programmed to:
detect a first amount of diffuse horizontal irradiance (DHI) and a first amount of direct normal irradiance (DNI) at a first specific point in time;
calculate a first angle for the tracker to maximize an amount of irradiance received by the tracker based on the first amount of diffuse horizontal irradiance, the first amount of direct normal irradiance, and an angle of the sun; and
transmit instructions to a rotational mechanism to change a plane of a tracker to the first angle.

17. The controller in accordance with claim 16, wherein the at least one processor is further programmed to:
detect a second amount of diffuse horizontal irradiance (DHI) and a second amount of direct normal irradiance (DNI) at a second specific point in time;
if the second amount of diffuse horizontal irradiance exceeds the second amount of direct normal irradiance, calculate a second angle for the tracker so that the tracker receives a portion of the second amount of diffuse horizontal irradiance and a portion of the second amount of direct normal irradiance;
if the second amount of diffuse horizontal irradiance does not exceed the second amount of direct normal irradiance, calculate the second angle for the tracker based on a position of the sun associated with the second specific point in time; and
transmit instructions to the rotational mechanism to change the plane of the tracker to the second angle.

18. The controller in accordance with claim 17, wherein the at least one processor is further programmed to wait a predetermined period of time between detecting the first amount of diffuse horizontal irradiance and detecting the second amount of diffuse horizontal irradiance.

19. The controller in accordance with claim 16, wherein the at least one processor is further programmed to:
determine if a difference between a current angle of the tracker and the first angle exceeds a predetermined threshold; and
if the difference exceeds the predetermined threshold, transmit instructions to the rotational mechanism to change the plane of the tracker to the first angle.

20. The controller in accordance with claim 16, wherein the at least one processor is further programmed to:
calculate an amount of irradiance collected for each angle of a plurality of angles between a current angle of the tracker and a horizontal angle for the tracker; and
identify the first angle of the plurality of angles based on a comparison of the corresponding amounts of irradiance to select one of the plurality of angles with the maximum amount of irradiance received.

* * * * *